INVENTOR
BOHUSLAV STREJC
BY
ATTORNEY 3,621,755
METHOD OF MANUFACTURE OF A GLOBOID
WHEEL AND AN ARRANGEMENT FOR ITS
MANUFACTURE
Bohuslav Strejc, Plzen, Czechoslovakia, assignor to
Skoda, narodni podnik, Plzen, Czechoslovakia
Filed Dec. 29, 1969, Ser. No. 888,645
Claims priority, application Czechoslovakia,
Dec. 29, 1968, 8,880/68
Int. Cl. B23f 13/06
U.S. Cl. 90—9.6                                4 Claims

ABSTRACT OF THE DISCLOSURE

The globoid worm wheel is worked by means of a multiknife milling head which both rotate at the transmission ratio of the globoid gear, the workpiece being radially fed into engagement with said milling head until the distance of their rotation axis coincides with the proper distance of the axis of the globoid gear, whereafter the external knives of the milling head are removed and the workpiece finished by the remaining knives in the course of their rotation at their transmission ratio after a limited relative turning of the workpiece with respect to the tool.

BACKGROUND OF THE INVENTION

This invention relates to the manufacturing of globoid worm wheels by means of a multiknife milling head.

Actually used manufacturing methods of globoid worm wheels apply multiknife milling heads with individual knives adjusted according to the law of a globoid helix. The knives are of the same type and are permanently clamped in the body of the milling head. These knives perform in the course of a radial feeding of the milling head with respect to the workpiece the rough machining part of the working operation with the same cutting edges as the finishing of the tooth flanks of the globoid worm wheel after reaching the proper axial distance of the worked gear by a limited circumferential turning of the workpiece with respect to the tool. In the course of the rough machining, the external edges of the multiknife milling head becomes quickly worn, the required surface quality of the tooth flanks is not achieved in the course of the finishing operations and it is even possible that some nonremoved material having a thickness of several hundreth parts of a millimeter could remain just on the engaging tooth flank part equally as on parts which are out of engagement. For these reasons the multiknife milling heads have to undergo a frequent sharpening, reducing the life time of the tool and increasing its maintenance costs.

SUMMARY OF THE INVENTION

It is an object of this invention to provide a manufacture of globoid worm wheels which would render exact products.

It is another object of this invention to provide a manufacture of globoid worm wheels which would allow to use tools for a substantial period without sharpening while manufacturing exact products.

Bearing these and other objects in mind, a multiknife milling head is used for working the globoid worm wheel which rotates together with the workpiece of the globoid worm wheel at the transmission ratio of the manufactured globoid worm gear, whereby the workpiece of the globoid worm wheel performs a relative radial feeding movement against the cutting edges of the multiknife milling head up to a distance equal to the proper axial distance of both parts of the globoid worm gear and after reaching said distance the external knives of the milling head are removed and the cutting edges of the remaining permanently clamped knives allowed to finish the engaging surfaces of the tooth flanks of the globoid worm wheel after its limited circumferential turning with respect to the milling head. In order to obtain more easily an entirely uniform shape of the tooth flanks of the worm wheel, the globoid worm gear has in case of a double or more threaded worm a number of threads of the worm which is not divisible in the number of teeth of the worm wheel.

The multiknife milling head is provided in addition to the permanently clamped cutting knives at both ends with removable cutting knives for the roughing operation, which are clamped in the body of the milling head so that their cutting edges for roughing the tooth flanks are in a position, coinciding at least in one point with the theoretical position of the generating line of the worm gear which is a tangent to the generating circle and perpendicular to the rotation axis of the worm, whereby the cutting edges of said knives for cutting gaps between teeth of the worm wheel between their roots are in a position corresponding for finished roughing with the root circle of the worm wheel, the corresponding cutting edges of the permanently clamped cutting knives for the latter working being advantageously in a similar position. The position of the removable cutting knives of the milling head is thus determined by the generating laws of the manufactured globoid worm gear.

An advantage of this arrangement is a prolonged life time of the permanently clamped cutting knives without additional sharpening achieved by the circumstance, that both removable knives at the ends of the milling head perform the whole roughing both with cutting edges which are cutting the gaps between the teeth of the worm wheel up to the root circle and in addition the tooth flanks with cutting edges, the position of which is determined by the generating line of the worm gear, whereas the permanently clamped cutting knives are cooperating in the course of roughing solely with cutting edges which contribute to the cutting of the gaps between the teeth but do not contribute at the roughing of the tooth flanks so that they remain for a considerable time capable to finish the fine milling of the tooth flanks after finished roughing after the relative position of the tool and workpiece has been adjusted by a minor circumferential turning. Thus the actual drawbacks of existing methods of manufacure of worm gear have been to a considerable extent eliminated. Another advantage are the reduced costs for proper maintenance of the whole machine tool.

DESCRIPTION OF DRAWINGS

An exemplary embodiment of an arrangement for performing the method according to this invention is schematically shown in the accompanying drawing, where.

DESCRIPTION OF PREFERRED EMBODIMENT

Figure 1:
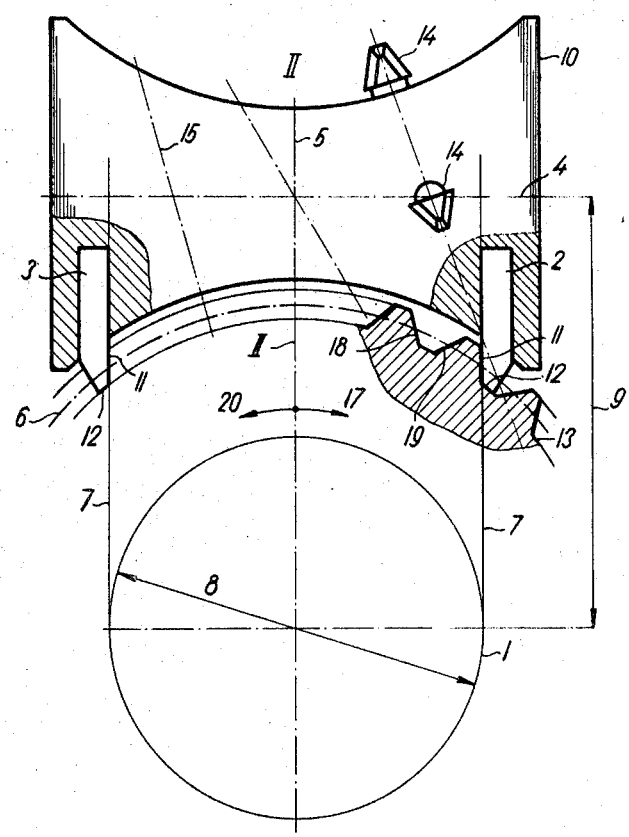
FIG. 1 represents in elevation the milling head and parts of the worked worm wheel in partly section.

The body 10 of the multiknife milling head has substantially the fundamental shape of a globoid worm. The axis 4 of the body 10 of the milling head is for finished roughing at the distance 9 from the axis of the worm wheel coincident with the center 5 of the generating circle 1 of the worm gear, said distance 9 being also coincident with the proper distance of the axis of the worm and worm wheel in operation. The multiknife milling head is provided with two kinds of knives, both knives 2 and 3 at the ends of the tool being removable and having a cutting edge 11 for roughing the tooth flanks of the worm wheel adjusted in dependence on the extreme position of the generating line 7 of the globoid worm gear, which is a tangent to the generating circle 1 of a diameter 8 and simultaneously perpendicular to the axis 4 of the milling head. The position of the cutting edges 11 is thus determined by the generating laws of the globoid helix of the globoid worm gear in accordance with conditions corresponding for instance to values on the pitch circle 6 of the globoid gear and considers equally possible requirements asking for adjustment of the helix of the globoid worm.

Figure 2:
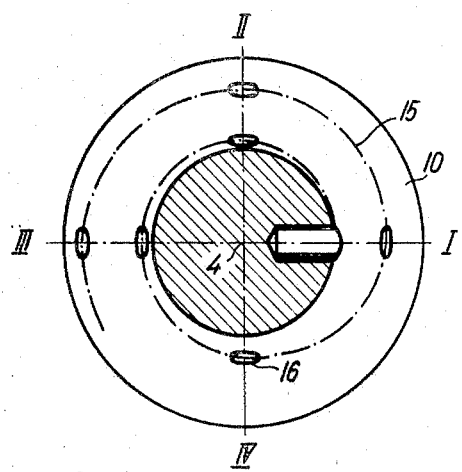
FIG. 2 a cross sectional view of the milling head with the section along the plane II—II as indicated in FIG. 1.

The permanently clamped knives 14 are supported in openings 16 of the body 10 of the milling head, whereby the axis of these knives point in a direction determined by a circle of the diameter 9, which is in the plane of symmetry of the body 10 perpendicular to its axis 4, said circle touching for a finished working the axis 5 of the worm wheel. The openings 16 are bored in direct dependence on the theoretical globoid helix 15 and their axis are generally arranged in several rows laying in a number of planes, passing through the axis 4 of the milling head. They are secured in the body 10 in the usual manner by laterally acting screws. In FIG. 2 showing a vertical cross sectional view of the body 10 of the milling head there are four such planes I, II, III, IV in which the axis of the knives 16 are arranged. The removable knives 2, 3 are advantageously beyond said planes I to IV. The permanently clamped knives 14 have such a width, that they do not come in the course of roughing in contact with the tooth flanks which are worked by the removable knives 2, 3. If some modification of the tooth flanks is used, the cutting edges of the knives are adjusted according to these requirements, but at any case at least one point of the cutting edge 11 for roughing the tooth flanks is on the generating line 7, which is a tangent to the generating circle 1 and perpendicular to the axis of the milling head.

The cutting edges 11 of the removable knives 2, 3 can be sharpened after their removal from the body 10 of the milling head while maintaining the correct shape and cutting angle and are again returned into the body 10 so that their circumferential edges 12 for cutting the tooth gaps extend to a distance corresponding to the diameter of the tooth circle of the worm wheel after finished roughing. The circumferential cutting edges of the permanently clamped knives 14 are advantageously in a similar position, in which they are able to clear possible remaining material at the corners of the tooth gaps on the root circle 13.

The described arrangement works as follows:

The multiknife milling head is clamped in a machine tool for milling teeth on the hobbing principle, on the worktable of which the workpiece of the globoid worm wheel is fixed. The rotating speeds of the milling head and of the worm wheel are adjusted according to the transmission ratio of the required globoid worm gear. The rotating workpiece is thereafter brought subsequently in a radial direction in engagement with the knives of the rotating milling head up to a distance corresponding to the correct axial distance 9 of the worm from the worm wheel. The roughing which is up to now performed practically only by the removable knives 2, 3 is thus finished and the machine is stopped. The removable knives 2, 3 are removed, a small circumferential turning of the workpiece with respect to the milling head in direction 17 performed and the first tooth flanks 18 of the globoid worm wheel finished by the permanently clamped knives 14. After a small turn of the workpiece with respect to the milling head in the opposite direction 20, the second tooth flanks 19 of the worm wheel are finished.

I claim:

1. A method of manufacture of a globoid worm wheel using a multiknife milling head rotating together with the globoid worm wheel at the transmission ratio of the manufactured globoid worm gear whereby the globoid worm wheel performs a relative radial feeding movement against the cutting edges of the multiknife milling head up to a distance equal to the proper axial distance of the worm and the worm wheel and after reaching said distance, the knives at the ends of the milling head are removed and the cutting edges of the remaining knives allowed to finish the tooth flanks of the worm wheel after its limited relative circumferential turning with respect to the milling head.

2. An arrangement for the manufacture of a globoid worm wheel with a multiknife milling head, comprising a rotational body of the shape substantially of a globoid worm, a number of cutting knives for finishing the flanks of the teeth of the globoid worm wheel clamped permanently on said body, removable cutting knives for roughing clamped at the ends of said body, said removable cutting knives provided with cutting edges for roughing of the tooth flanks of the worm wheel and with cutting edges for cutting the gaps between the teeth of the worm wheel, the cutting edges of said removable cutting knives for roughing the tooth flanks of the globoid worm wheel arranged in a position coinciding at least in one point with the theoretical position of the generating line of the worm gear which is a tangent to the generating circle and perpendicular to the rotation axis of the worm, the cutting edges for cutting the gaps between teeth of the worm wheel arranged in a position corresponding for finished roughing with the root circle of the worm wheel, said permanently clamped knives having cutting edges for finishing the tooth flanks of the worm wheel and cutting edges for cutting the bottom part of the tooth gaps between the roots of the teeth, the cutting edges for finishing the tooth flanks of the worm wheel being in the course of roughing out of engagement with the tooth flanks.

3. An arrangement as claimed in claim 2, the permanently clamped knives arranged on the body of the milling head in rows in planes passing through the axis of the body of the milling head, being simultaneously on the theoretical globoid helix of the globoid worm, the removable knives being beyond said planes.

4. An arrangement as claimed in claim 2 for worm wheels with modified tooth flanks, the cutting edges of the removable cutting knives for roughing operations adjusted to said modifications, at least one point of said cutting edges being however on the generating line of the worm gear perpendicular to the axis of the rotation axis of the worm.

References Cited

UNITED STATES PATENTS

| | | | |
|---|---|---|---|
| 1,373,956 | 4/1921 | Farnum | 90—5 |
| 1,812,384 | 6/1931 | Trbojevich | 90—5 |

GERALD A. DOST, Primary Examiner